(12) United States Patent
Kim et al.

(10) Patent No.: US 11,200,684 B2
(45) Date of Patent: Dec. 14, 2021

(54) APPARATUS AND METHOD FOR MEASURING FLOW VELOCITY OF STREAM USING OPTICAL FLOW IMAGE PROCESSING

(71) Applicants: HYDROSEM, Yongin-si (KR); REPUBLIC OF KOREA (NATIONAL DISASTER MANAGEMENT RESEARCH INSTITUTE), Ulsan (KR)

(72) Inventors: Seo Jun Kim, Yongin-si (KR); Byung Man Yoon, Yongin-si (KR); Ho Jun You, Yongin-si (KR); Dong Su Kim, Incheon (KR); Tae Sung Cheong, Seoul (KR); Jae Seung Joo, Ulsan (KR); Hyeon Seok Choi, Ulsan (KR)

(73) Assignees: HYDROSEM, Yongin-si (KR); REPUBLIC OF KOREA (NATIONAL DISASTER MANAGEMENT RESEARCH INSTITUTE), Ulsan (KR)

( * ) Notice: Subject to any disclaimer, the term of this patent is extended or adjusted under 35 U.S.C. 154(b) by 239 days.

(21) Appl. No.: 16/617,331

(22) PCT Filed: Nov. 29, 2018

(86) PCT No.: PCT/KR2018/014983
§ 371 (c)(1),
(2) Date: Nov. 26, 2019

(87) PCT Pub. No.: WO2020/101103
PCT Pub. Date: May 22, 2020

(65) Prior Publication Data
US 2021/0327075 A1    Oct. 21, 2021

(30) Foreign Application Priority Data
Nov. 13, 2018    (KR) .......................... 10-2018-0139088

(51) Int. Cl.
 *G06K 9/00* (2006.01)
 *G06T 7/246* (2017.01)

(52) U.S. Cl.
 CPC .... *G06T 7/248* (2017.01); *G06T 2207/30181* (2013.01)

(58) Field of Classification Search
 CPC ...................... G06T 7/248; G06T 2207/30181
 (Continued)

(56) References Cited

U.S. PATENT DOCUMENTS

2007/0280507 A1* 12/2007 Murali .................... G06T 7/269
382/107

FOREIGN PATENT DOCUMENTS

| JP | 2008-058264 A | 3/2008 |
|---|---|---|
| KR | 10-0817907 B1 | 3/2008 |

(Continued)

OTHER PUBLICATIONS

International Search Report for PCT/KR2018/014983 dated Aug. 13, 2019 from Korean Intellectual Property Office.

*Primary Examiner* — Stephen P Coleman
(74) *Attorney, Agent, or Firm* — Paratus Law Group, PLLC

(57) ABSTRACT

Disclosed is a river flow velocity measurement device using optical flow image processing, including: an image photographing unit configured to acquire consecutive images of a flow velocity measurement site of a river; an image conversion analysis unit configured to dynamically extract frames of the consecutive images in order to normalize image data of the image photographing unit, image-convert the extracted frames, and perform homography calculation; an analysis region extracting unit configured to extract an analysis region of an analysis point; a pixel flow velocity calculating unit configured to calculate a pixel flow velocity (Continued)

using an image in the analysis region of the analysis point extracted by the analysis region extracting unit; and an actual flow velocity calculating unit configured to convert the pixel flow velocity calculated by the pixel flow velocity calculating unit into an actual flow velocity.

20 Claims, 9 Drawing Sheets

(58) Field of Classification Search
USPC .......................................................... 382/107
See application file for complete search history.

(56) References Cited

FOREIGN PATENT DOCUMENTS

| | | |
|---|---|---|
| KR | 10-2016-0100788 A | 8/2016 |
| KR | 10-1741501 B1 | 5/2017 |
| KR | 10-1753360 B1 | 7/2017 |

* cited by examiner

FIG. 7
- DerivativeX
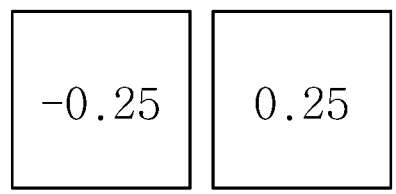
- DerivativeT((t-1)Frame)
- DerivativeY
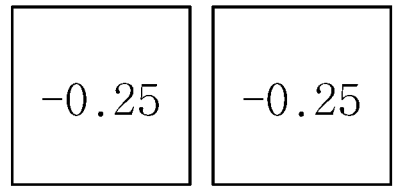
- DerivativeT(t Frame)

APPARATUS AND METHOD FOR MEASURING FLOW VELOCITY OF STREAM USING OPTICAL FLOW IMAGE PROCESSING

CROSS-REFERENCE TO PRIOR APPLICATIONS

This application is a National Stage Patent Application of PCT International Patent Application No. PCT/KR2018/014983 (filed on Nov. 29, 2018) under 35 U.S.C. § 371, which claims priority to Korean Patent Application No. 10-2018-0139088 (filed on Nov. 13, 2018), which are all hereby incorporated by reference in their entirety.

BACKGROUND

The present invention relates to stream flow velocity measurement, and more particularly, to a device and a method for measuring a stream flow velocity using optical flow image processing, which calculate a pixel flow velocity from consecutive images collected by a camera for cross-sectional information, an analysis time, an analysis interval, and an analysis region of a site and convert the calculated pixel flow velocity into an actual physical flow velocity to increase the efficiency and accuracy of the flow velocity measurement.

Generally, in order to measure a flow velocity of water flowing through a stream, when water flows normally, methods using detectors such as a propeller velocity meter, a cup-type velocity meter, an electronic velocity meter, and the like are in use, and during flooding, a float observation method is mainly in use.

The velocity meters used to measure the flow velocity during the normal water flow can only measure a flow velocity at one point, which makes it difficult to analyze vortex formation or a flow direction.

As a result, it takes a great deal of time, effort, and money to measure a flow velocity over a full width of the stream.

Meanwhile, when a flood occurs in the stream, a flow velocity is high and a water depth is high, and thus there are many risks in approaching the stream. For this reason, the conventional velocity meters in which a detector such as a propeller velocity meter or an electronic velocity meter should be put into water is difficult to use during flooding.

On the other hand, in the float observation method which is widely used in floods, high accuracy observation cannot be expected due to manpower problems, lack of readiness (high probability of peak discharge missing), unavailability of continuous observation, follow-up indicating whether a float accurately follows water with a flow velocity, choice of a length of the float, or the like.

In particular, small streams, unlike the national and local streams, have a small basin area and a steep slope so that a peak arrival time is very short and the flow is complex. Therefore, the float observation method is less reliable. In addition, in the small streams, since it is difficult to find a straight line having a certain length to use the float and find a safe area for measurement, non-contact measurement technology that can be utilized in small streams is required.

Currently, in Korea, although 22,823 small streams are distributed throughout the country, the number of local government officials who can manage the streams is absolutely insufficient.

For this reason, only national streams managed by the central government have been measured so far. Due to an improved quality of life, demands for reducing flood damage of small streams in local communities are increasing such that there is a need for automated measurement technology in which streams may be measured with less manpower.

Therefore, various methods have been sought to automate or facilitate such measurement. Among the methods, a surface image flow velocity measurement method is a method likely to solve various problems of the conventional methods.

The surface image flow velocity measurement method is a method of calculating a flow velocity by extracting an image of a stream surface from an aerial photograph or video image of the stream surface.

The surface image flow velocity measurement method is largely divided into a method using template pattern matching and a method using a spatio-temporal image (STI).

The template pattern matching is a method of measuring a two-dimensional flow velocity distribution of a stream surface using a pair of images on the basis of particle image velocimetry (PIV).

The template pattern matching is a method of dividing a frame into blocks of a certain size and calculating a moving distance by finding a block having a contrast value most similar to a current block in the next frame. A difference in average absolute value should be calculated for all the displacements around the block in order to increase the accuracy of moving distance vector estimation. In this case, as a window size increases, more computation time is required and thus it is difficult to measure the flow velocity in real time.

Meanwhile, the STI analysis method is a method of analyzing a plurality of consecutive images (spatial-temporal images) at once and analyzing an average flow velocity during a time period.

An example of using a spatio-temporal image is space-temporal image velocimetry (STIV).

However, the STIV has a problem in that a transverse distribution of the flow velocity is measured by limiting a measurement target to only a mainstream direction component in order to improve practicality.

In addition, the STI analysis method is a method of calculating a flow velocity by calculating a change in contrast values of several consecutive pixels in an image according to the time. The STIV is good for calculating a time-averaged flow velocity because the contrast values of the pixel should be obtained for a certain period of time. However, when there are many ripples on the water surface, a great deal of noise may be generated and thus the accuracy may be reduced.

In particular, since the contrast values have to be time-averaged, there are limitations in applying the STIV to the real-time flow velocity measurement because of a large amount of calculation.

In such flow velocity measurement methods in the related art, the image acquisition and image analysis process are complicated and it is difficult to automatically measure the flow velocity in real time because reference point measurement is required.

In particular, a two-dimensional projection coordinate conversion method and a three-dimensional projection coordinate conversion method are used for image conversion in the image acquisition and image analysis process in the related art.

In the two-dimensional projection coordinate conversion method, at least four reference points having the same height as a water surface are required and it is necessary but difficult to reset the heights of the reference points according to a change in water depth and thus many errors occur.

Further, in the three-dimensional projection coordinate conversion method, six reference points having different heights and one reference point having the same height as a water surface are required and a new mapping coefficient needs to be applied according to a change in water depth.

In such a three-dimensional projection coordinate conversion method, when the water depth is increased to be higher than the six reference points having different heights, the method is not applicable and there are many reference points and thus the accuracy is degraded due to measurement errors.

Therefore, there is a demand for the development of a technology in which a flow velocity of a stream is measured using a new image processing method.

SUMMARY

The present invention is directed to solving the problems of the stream flow velocity measurement technique in the related art and is directed to providing a device and a method for measuring a stream flow velocity using optical flow image processing, which calculate a pixel flow velocity from consecutive images collected by a camera for cross-sectional information, an analysis time, an analysis interval, and an analysis region of a site and convert the calculated pixel flow velocity into an actual physical flow velocity to increase the efficiency and accuracy of the flow velocity measurement.

The present invention is directed to providing a device and a method for measuring a stream flow velocity using optical flow image processing, which store correlations between actual coordinates and image coordinates in the form of a matrix when an image is converted and covert a flow velocity calculated as a pixel flow velocity into an actual flow velocity using the matrix to increase the accuracy of the flow velocity calculation.

The present invention is directed to providing a device and a method for measuring a stream flow velocity using optical flow image processing, which store images in an array by reading a preset grid setting and declaring the number (N) of images to be analyzed and the array (a matrix) for storing analysis results and repeat analysis between images as many times as the number of grid points to increase the accuracy of the surface flow velocity field calculation.

The present invention is directed to providing a device and a method for measuring a stream flow velocity using optical flow image processing, which calculate a pixel flow velocity, determine a grid point position, a pixel flow velocity, and a filter coefficient parameter, and perform filtering when an error calculated when a point flow velocity is calculated is greater than the filter coefficient so as to increase the accuracy of the point flow velocity calculation.

The present invention is directed to providing a device and a method for measuring a stream flow velocity using optical flow image processing, which allow image coordinates of a reference point viewed by a camera not to be changed even when a water depth changes by applying a method for image distortion correction in consideration of a change in stream water depth, allow errors of the measured actual coordinates and conversion results not to be generated, and thus allow the image distortion to be accurately corrected.

The scope of the present invention is not limited to the above-described objects, and other unmentioned objects may be clearly understood by those skilled in the art from the following descriptions.

One aspect of the present invention provides a stream flow velocity measurement device using optical flow image processing, which includes: an image photographing unit configured to acquire consecutive images of a flow velocity measurement site of a stream; an image conversion analysis unit configured to dynamically extract frames of the consecutive images in order to normalize image data of the image photographing unit, image-convert the extracted frames, and perform homography calculation; an analysis region extracting unit configured to extract an analysis region of an analysis point; a pixel flow velocity calculating unit configured to calculate a pixel flow velocity using an image in the analysis region of the analysis point extracted by the analysis region extracting unit; and an actual flow velocity calculating unit configured to convert the pixel flow velocity calculated by the pixel flow velocity calculating unit into an actual flow velocity.

Here, the image conversion analysis unit may calculate average X and Y coordinates of input points, move corresponding coordinates to an origin, convert a distance between the input points and the average X and Y coordinates, and normalize image data in order to perform homography calculation.

In order to calculate a surface flow velocity field to which an optical flow is applied, the pixel flow velocity calculating unit may read a preset grid setting, declare the number (N) of images to be analyzed and an array (a matrix) for storing analysis results, store the image in the array, and calculate the surface flow velocity field by repeating analysis between images as many times as the number of grid points.

In order to calculate a point flow velocity, the pixel flow velocity calculating unit may calculate the pixel flow velocity by declaring an image parameter and a grid point parameter, and extracting the image at a grid point position, determine a grid point position parameter, a pixel flow velocity parameter, and a filter coefficient parameter, perform filtering when an error when a point flow velocity error is calculated is greater than a filter coefficient, and calculate the point flow velocity.

In order to correct distortion of the image photographed by the image photographing unit, four reference points may be installed at a height of a bank such that coordinates of an image of the reference point viewed by a camera are not changed even when a water depth is changed, and actual coordinates $(X'_0, Y'_0, Z'_0)$ of a point (A') at the same height as a water surface may be obtained using actual coordinates $(X_c, Y_c, H)$ of the camera, a height (H) from the camera to the water surface, and actual coordinates $(X_0, Y_0, Z_0)$ of a reference point (A) on the bank.

Another aspect of the present invention provides a stream flow velocity measurement method using optical flow image processing, which includes: an image photographing operation of acquiring consecutive images of a flow velocity measurement site of a stream; an image conversion analyzing operation of dynamically extracting frames of the consecutive images, image-converting the extracted frames, and performing homography calculation in order to normalize image data acquired in the image photographing operation; an analysis region extracting operation of extracting an analysis region of an analysis point; a pixel flow velocity calculating operation of calculating a pixel flow velocity through the image in the analysis region of the analysis point extracted in the analysis region extracting operation; and an actual flow velocity calculating operation of converting the pixel flow velocity calculated in the pixel flow velocity calculating operation into an actual flow velocity.

A device and a method for measuring a stream flow velocity using optical flow image processing according to the present invention have the following effects.

First, a pixel flow velocity is calculated from consecutive images collected by a camera for cross-sectional information, an analysis time, an analysis interval, and an analysis region of a site and the calculated pixel flow velocity is converted into an actual physical flow velocity, and thus the efficiency and accuracy of the flow velocity measurement can be increased.

Second, correlations between actual coordinates and image coordinates are stored in the form of a matrix when an image is converted and a flow velocity calculated as a pixel flow velocity is converted into an actual flow velocity using the matrix, and thus the accuracy of the flow velocity calculation can be increased.

Third, images are stored in an array by reading a preset grid setting and declaring the number (N) of images to be analyzed and the array (a matrix) for storing analysis results and analysis between images is repeated as many times as the number of grid points, and thus the accuracy of the surface flow velocity field calculation can be increased.

Fourth, a pixel flow velocity is calculated, a grid point position, a pixel flow velocity, and a filter coefficient parameter are determined, and filtering is performed when an error calculated when a point flow velocity is calculated is greater than a filter coefficient, and thus the accuracy of the point flow velocity calculation can be increased.

Fifth, image coordinates of a reference point viewed by a camera are allowed not to be changed by applying a method for image distortion correction in consideration of a change in stream water depth even when a water depth changes, and errors of the measured actual coordinates and conversion results are allowed not to be generated, and thus the image distortion is allowed to be accurately corrected.

BRIEF DESCRIPTION OF THE DRAWINGS

FIGS. 6 and 7 are differential functions when a pixel flow velocity is calculated according to the present invention.

DETAILED DESCRIPTION

Hereinafter, exemplary embodiments of a device and a method for measuring a stream flow velocity using optical flow image processing according to the present invention will be described in detail as follows.

Features and advantages of the device and the method for measuring the stream flow velocity using optical flow image processing according to the present invention will become clear from the detailed description of each embodiment below.

Figure 1:
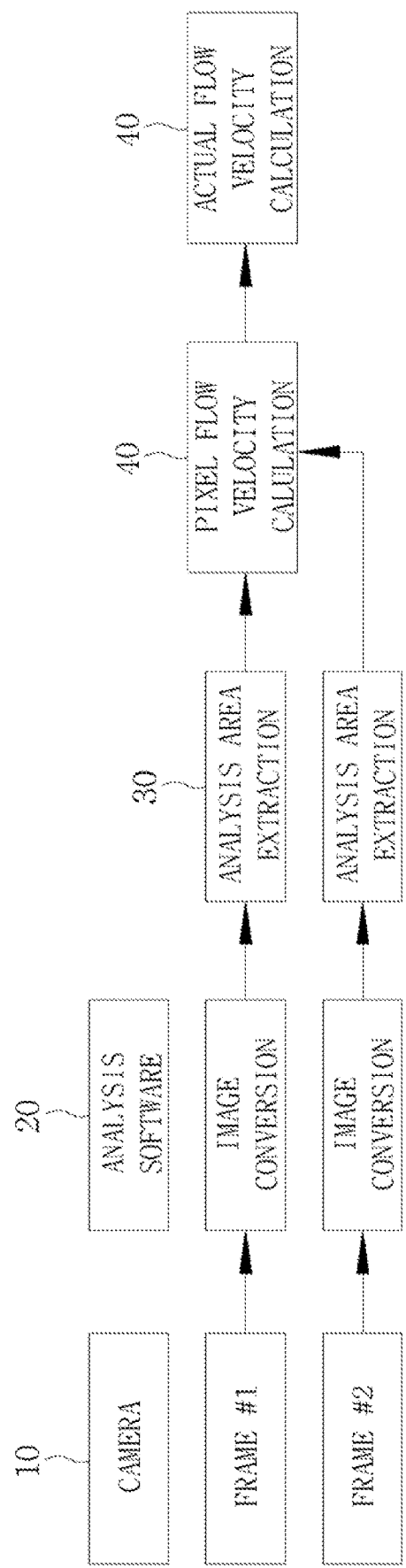
FIG. 1 is a configuration diagram of a stream flow velocity measurement device using optical flow image processing according to the present invention.
Figure 2:
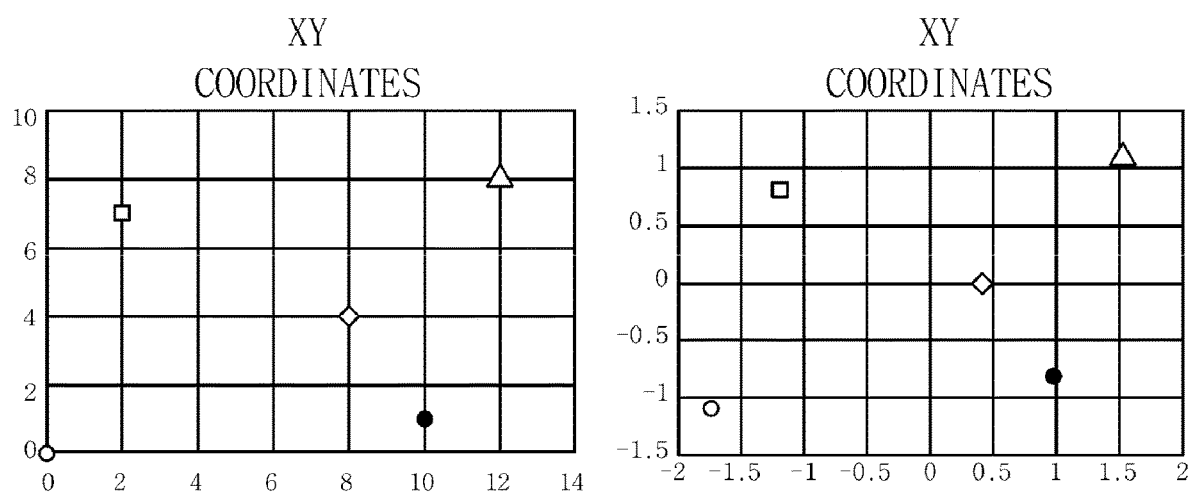
FIG. 2 is a configuration diagram illustrating examples of image conversion coordinates.

FIG. 1 is a configuration diagram of a stream flow velocity measurement device using optical flow image processing according to the present invention, and FIG. 2 is a configuration diagram illustrating examples of image conversion coordinates.

The device and the method for measuring the stream flow velocity using optical flow image processing according to the present invention may calculate a pixel flow velocity from consecutive images collected by a camera for cross-sectional information, an analysis time, an analysis interval, and an analysis region of a site and convert the calculated pixel flow velocity into an actual physical flow velocity, and thus the efficiency and accuracy of the flow velocity measurement may be increased.

In the optical flow image processing according to the present invention, a place where a contrast value distribution at a specific position of one frame and a contrast value distribution at a next frame are best matched is found so that a moving distance is calculated.

Since the moving distance is calculated using the contrast value of each pixel in the image, the calculation time is advantageously very short. Therefore, the real-time flow velocity may be calculated very rapidly even in the case of a sharp increase in a discharge in the stream so that the optical flow image processing may be effectively applied to real-time flow velocity measurement of the stream that cannot be performed by large scale particle image velocimetry (LSPIV) and space-temporal image velocimetry (STIV).

To this end, the present invention may include a configuration in which correlations between actual coordinates and image coordinates are stored in the form of a matrix when an image is converted and a flow velocity calculated as a pixel flow velocity is converted into an actual flow velocity using the matrix.

The present invention may include a configuration in which images are stored in an array by reading a preset grid setting and declaring the number N of images to be analyzed and the array (a matrix) for storing analysis results and analysis between images is repeated as many times as the number of grid points so that the accuracy of the surface flow velocity field calculation may be increased.

The present invention may include a configuration in which a pixel flow velocity is calculated, a grid point position, a pixel flow velocity, and a filter coefficient parameter are determined, and filtering is performed when an error calculated when a point flow velocity is calculated is greater than a filter coefficient.

The present invention may use a two-dimensional projection coordinate conversion program and a cross-correlation method in order to measure the surface flow velocity and include an image conversion configuration for converting the distorted image into the normal image, an image analysis configuration for measuring the surface flow velocity using a cross-correlation method (calculate the displacement of tracer groups by searching for similarity of contrast value distribution within the size of the correlation region), a filtering configuration for removing data having a low correlation coefficient among pieces of the measured flow velocity data, and a configuration for storing the measured flow velocity data which is time-averaged as measurement results.

The present invention may include a configuration in which image coordinates of a reference point viewed by a camera are allowed not to be changed by applying a method for image distortion correction in consideration of a change in stream water depth even when the water depth changes, and errors of the measured actual coordinates and conversion results are allowed not to be generated, and thus the image distortion is allowed to be accurately corrected.

The stream flow velocity measurement device using optical flow image processing according to the present invention includes an image photographing unit 10 which acquires consecutive images of a flow velocity measurement site of a stream, an image conversion analysis unit 20 which dynamically extracts frames of the consecutive images in order to normalize image data of the image photographing unit 10, image-converts the extracted frames, and performs homography calculation, an analysis region extracting unit 30 which extracts an analysis region of an analysis point, a pixel flow velocity calculating unit 40 which calculates a pixel flow velocity using an image in the analysis region of the analysis point extracted by the analysis region extracting unit 30, and an actual flow velocity calculating unit 50 which converts the pixel flow velocity calculated by the pixel flow velocity calculating unit 40 into an actual flow velocity as illustrated in FIG. 1.

Here, the image conversion analysis unit 20 normalizes the image data for the homography calculation due to rotation, scale, and parallelism preservation being generated based on an origin [0,0].

The normalization of the image data means that average X and Y coordinates of input points are calculated, the corresponding coordinates are moved to the origin, and a distance between the input points and the average X and Y coordinates is converted, as illustrated in FIG. 2.

The homography calculation will be described in detail as follows.

Equation 1 shows a homogeneous form.

$$\begin{bmatrix} x' \\ y' \\ 1 \end{bmatrix} = \begin{bmatrix} h_{11} & h_{12} & h_{13} \\ h_{21} & h_{22} & h_{23} \\ h_{31} & h_{32} & 1 \end{bmatrix} \begin{bmatrix} x \\ y \\ 1 \end{bmatrix}$$ [Equation 1]

$$A' = HA$$

Here, x and y denote coordinates before the image conversion, x' and y' denote coordinates after the image conversion, and $h_{11}$, $h_{12}$, $h_{13}$, $h_{21}$, $h_{22}$, $h_{23}$, $h_{31}$, and $h_{32}$ denote parameters required for the image conversion.

Equation 2 and Equation 3 show forms for the homography calculation.

$$\begin{bmatrix} x' \\ y' \\ 1 \end{bmatrix} = \begin{bmatrix} h_{11} & h_{12} & h_{13} \\ h_{21} & h_{22} & h_{23} \\ h_{31} & h_{32} & 1 \end{bmatrix} \begin{bmatrix} x \\ y \\ 1 \end{bmatrix} =$$ [Equation 2]

$$\begin{bmatrix} h_{11}x + h_{12}y + h_{13} \\ h_{21}x + h_{22}y + h_{23} \\ h_{31}x + h_{32}y + 1 \end{bmatrix} \rightarrow x' = \frac{h_{11}x + h_{12}y + h_{13}}{h_{31}x + h_{32}y + 1},$$

$$y' = \frac{h_{21}x + h_{22}y + h_{23}}{h_{31}x + h_{32}y + 1}$$

$$\begin{bmatrix} x_1 & y_1 & 1 & 0 & 0 & 0 & -x_1 x'_1 & -y_1 x'_1 \\ 0 & 0 & 0 & x_1 & y_1 & 1 & -x_1 y'_1 & -y_1 y'_1 \\ \cdots & \cdots & \cdots & \cdots & \cdots & \cdots & \cdots & \cdots \\ 0 & 0 & 0 & x_4 & y_4 & 1 & -x_4 y'_4 & -y_4 y'_4 \end{bmatrix} \begin{bmatrix} h_{11} \\ h_{12} \\ h_{13} \\ h_{21} \\ h_{22} \\ h_{23} \\ h_{31} \\ h_{32} \end{bmatrix} =$$ [Equation 3]

$$\begin{bmatrix} x'_1 \\ x'_4 \\ \cdots \\ y'_4 \end{bmatrix} \Rightarrow AX = B \Rightarrow X = A^{-1}B$$

In order to calculate a surface flow velocity field to which the optical flow is applied, the pixel flow velocity calculating unit 40 stores images in an array by reading a preset grid setting and declaring the number N of images to be analyzed and the array (a matrix) for storing analysis results, and repeats analysis between images as many times as the number of grid points to increase the accuracy of the surface flow velocity field calculation.

In order to calculate a point flow velocity, the pixel flow velocity calculating unit 40 calculates a pixel flow velocity by declaring an image and a grid point parameter and extracting an image at a position of a grid point, determines a grid point position, a pixel flow velocity, and a filter coefficient parameter, and performs filtering when an error calculated when the point flow velocity is calculated is greater than a filter coefficient to increase the accuracy of the point flow velocity calculation.

The present invention includes the following configuration of pixel flow velocity calculation for calculating the pixel flow velocity through the image of the analysis region on the basis of the analysis point.

It is assumed that a brightness value of an object is not changed even after a short time. A movement of each image is very small so that an equation for calculating the pixel flow velocity may be defined as in Equation 4.

$$I(x,y,t) = I(x+\delta x, y+\delta y, t+\delta t)$$ [Equation 4]

Here, I denotes a contrast value of the pixel in the image, x denotes an X-direction coordinate, y denotes a Y-direction coordinate, t denotes time, and $\delta_t$ denotes an amount of time change.

When a right expression of Equation 4 is expanded as Taylor series, it is summarized as in the following equation, $$I(x+\delta x, y+\delta y, t+\delta t) =$$ [Equation 5]

$$I(x, y, t) + \frac{\partial I}{\partial x}\delta x + \frac{\partial I}{\partial y}\delta y + \frac{\partial I}{\partial t}\delta t + .$$

In order to satisfy Equation 4 and Equation 5 at the same time, a sum of the differentials of right expression of Equation 5 should be zero.

$$\frac{\partial I}{\partial x}\delta x + \frac{\partial I}{\partial y}\delta y + \frac{\partial I}{\partial t}\delta t = 0$$ [Equation 6]

Therefore, an equation for calculating the pixel flow velocity is defined as follows:

$$\frac{\partial I}{\partial x}\delta x + \frac{\partial I}{\partial y}\delta y + \frac{\partial I}{\partial t}\delta t = 0 \rightarrow I_x V_x + I_y V_y = -I_t \quad \text{[Equation 7]}$$

Here, $I_x$ denotes an X-direction differential matrix of the image, $I_y$ denotes a Y-direction differential matrix of the image, $V_x$ denotes an X-direction pixel velocity, $V_y$ denotes a Y-direction pixel velocity, and $I_t$ denotes a time differential matrix of the image.

In order to obtain the pixel velocity using Equation 7, it is converted into a matrix as shown in Equation 8 and solved.

$$Av = b, \text{ and} \quad \text{[Equation 8]}$$

$$A = \begin{bmatrix} I_x(q_1) & I_y(q_1) \\ I_x(q_2) & I_y(q_2) \\ \vdots & \vdots \\ I_x(q_n) & I_y(q_n) \end{bmatrix} \quad v = \begin{bmatrix} V_x \\ V_y \end{bmatrix} \quad b = \begin{bmatrix} -I_t(q_1) \\ -I_t(q_2) \\ \vdots \\ -I_t(q_n) \end{bmatrix},$$

Here, $q_n$ denotes an $n^{th}$ pixel and n denotes the number of pixels in the image.

The process of converting the pixel flow velocity into the actual flow velocity in the actual flow velocity calculating unit 50 is defined as in Equation 9.

$$V_\gamma = V_p \times LPP \times K \quad \text{[Equation 9]}$$

Here, $V_\gamma$ denotes the actual flow velocity, $V_p$ denotes the pixel flow velocity, LPP denotes a distance per pixel, and K denotes a scale factor.

The distance per pixel is defined as in Equation 10.

$$LPP = \frac{\sum_{i=0}^{N-1} L_r}{\sum_{i=0}^{N-1} L_p} \quad \text{[Equation 10]}$$

Here, LPP denotes the distance per pixel, N denotes the number of reference points of the image conversion, $L_\gamma$ denotes a physical distance between two neighboring reference points of the image conversion, and $L_p$ denotes a pixel distance between two neighboring reference points of the image conversion.

The scale factor is defined as in Equation 11.

$$K = \frac{D_2}{D_1} \quad \text{[Equation 11]}$$

Here, K denotes the scale factor, $D_1$ denotes an initial average altitude difference between the sensor and the reference point of the image conversion, and $D_2$ denotes an average altitude difference between the sensor and the reference point of the image conversion.

The actual flow velocity calculation method using the flow velocity measurement device using optical flow image processing according to the present invention having such a configuration will be described in detail as follows.

Figure 3:
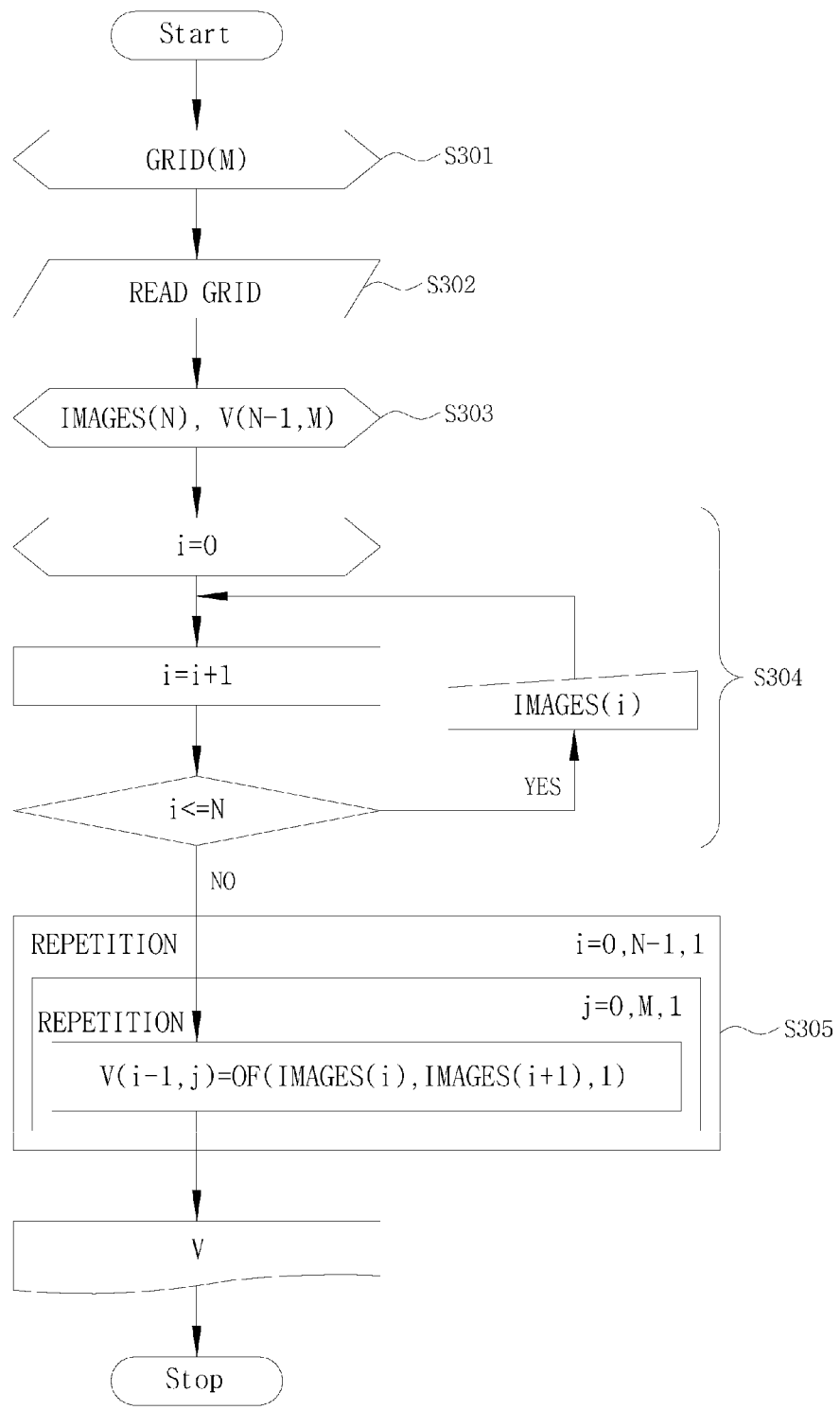
FIG. 3 is a flowchart illustrating a method of calculating a surface flow velocity field using an optical flow according to the present invention.
Figure 4:
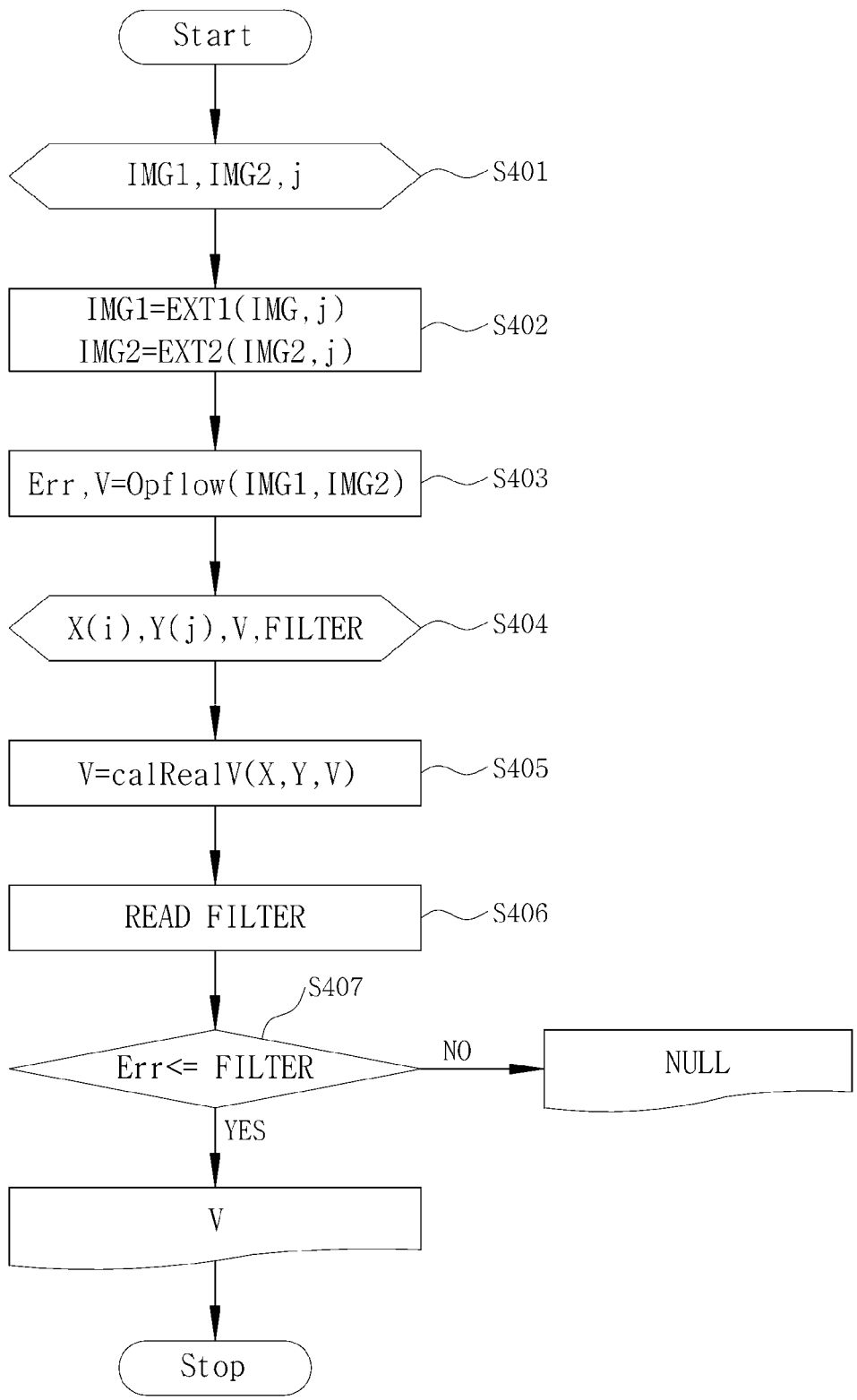
FIG. 4 is a flowchart illustrating a method of calculating a point flow velocity according to the present invention.

FIG. 3 is a flowchart illustrating a method of calculating a surface flow velocity field using an optical flow according to the present invention, and FIG. 4 is a flowchart illustrating a method of calculating a point flow velocity according to the present invention.

The flow velocity measurement method using optical flow image processing according to the present invention includes an image photographing operation of acquiring consecutive images of a flow velocity measurement site of a stream, an image conversion analyzing operation of dynamically extracting frames of the consecutive images, image-converting the extracted frames and performing homography calculation in order to normalize image data acquired in the image photographing operation, an analysis region extracting operation of extracting an analysis region of an analysis point, a pixel flow velocity calculating operation of calculating a pixel flow velocity through the image in the analysis region of the analysis point extracted in the analysis region extracting operation, and an actual flow velocity calculating operation of converting the pixel flow velocity calculated in the pixel flow velocity calculating operation into an actual flow velocity.

Here, in the pixel flow velocity calculating operation, first, in order to calculate a surface flow velocity field to which the optical flow is applied, a grid parameter including M points to be analyzed is defined as illustrated in FIG. 3 (S301).

Subsequently, a preset grid setting is read (S302) and the number N of images to be analyzed and an array (a matrix) for storing analysis results are declared (S303).

Images photographed by a camera are stored in the array (S304).

The analysis between images is repeated as many times as the number of grid points and the analysis results are stored in the array (S305).

In the pixel flow velocity calculating operation, the image and the grid point parameter are declared to calculate a point flow velocity, as illustrated in FIG. 4 (S401), and the image is extracted at a grid point position (S402).

Subsequently, an optical flow pixel flow velocity calculation algorithm is applied (S403), a grid point position parameter, a pixel flow velocity parameter, and a filter coefficient parameter are declared (S404), and the grid point position and the pixel flow velocity are converted into an actual flow velocity (S405).

When the calculated flow velocity error is greater than the filter coefficient, filtering is performed. Otherwise, a result of the flow velocity calculation is output so that the accuracy of the point flow velocity calculation is increased (S406).

Figure 5:
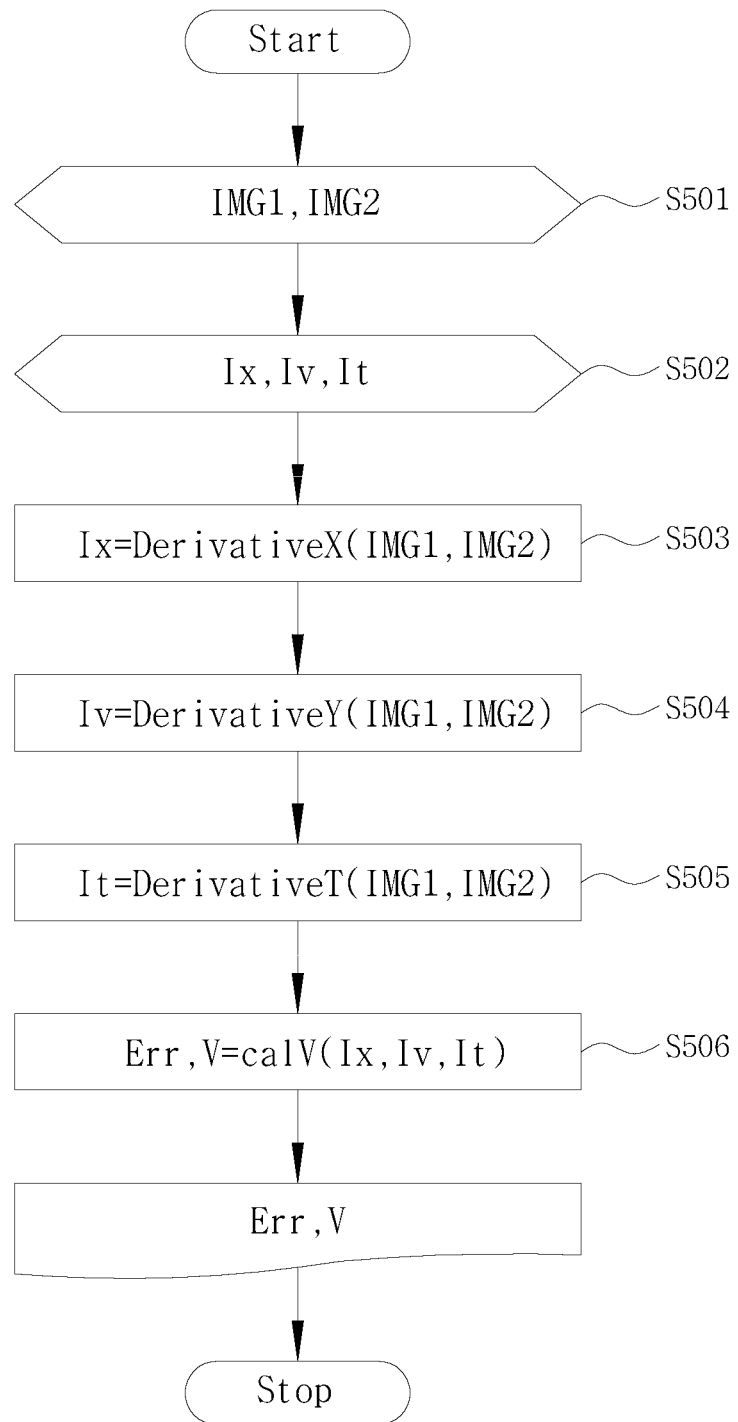
FIG. 5 is a flowchart illustrating a method of calculating a pixel flow velocity according to the present invention.
Figure 6:
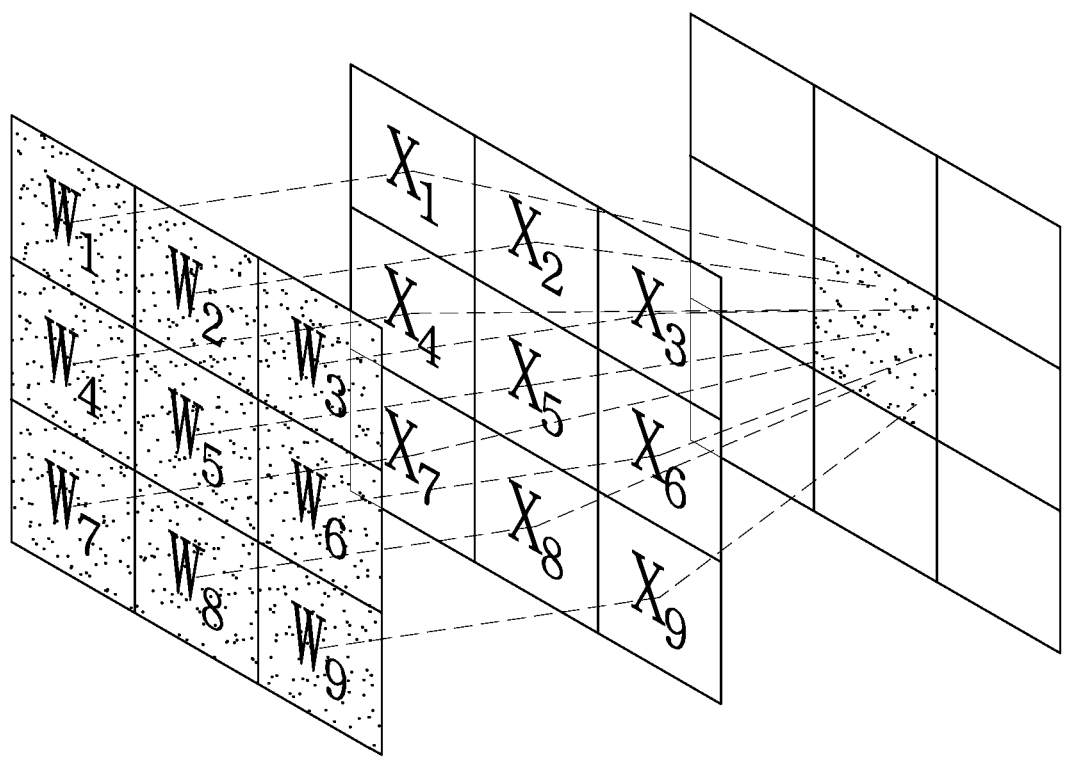

FIG. 5 is a flowchart illustrating a method of calculating a pixel flow velocity according to the present invention, and FIGS. 6 and 7 are differential functions when a pixel flow velocity is calculated according to the present invention.

In the pixel flow velocity calculating operation, as illustrated in FIG. 5, an image parameter is declared (S501), and an X-direction parameter, a Y-direction parameter, and a time differential parameter are declared (S502).

An X-direction image differential is performed (S503), a Y-direction image differential is performed (S504), a time direction image differential is performed (S505), and thus the pixel flow velocity is calculated (S506).

In the flow velocity measurement device and method using optical flow image processing according to the present invention having such a configuration, image coordinates of a reference point viewed by a camera are allowed not to be changed by applying a method for image distortion correction in consideration of a change in stream water depth even when the water depth changes, and errors of the measured actual coordinates and conversion results are allowed not to be generated, and thus the image distortion is allowed to be accurately corrected.

Figure 8:
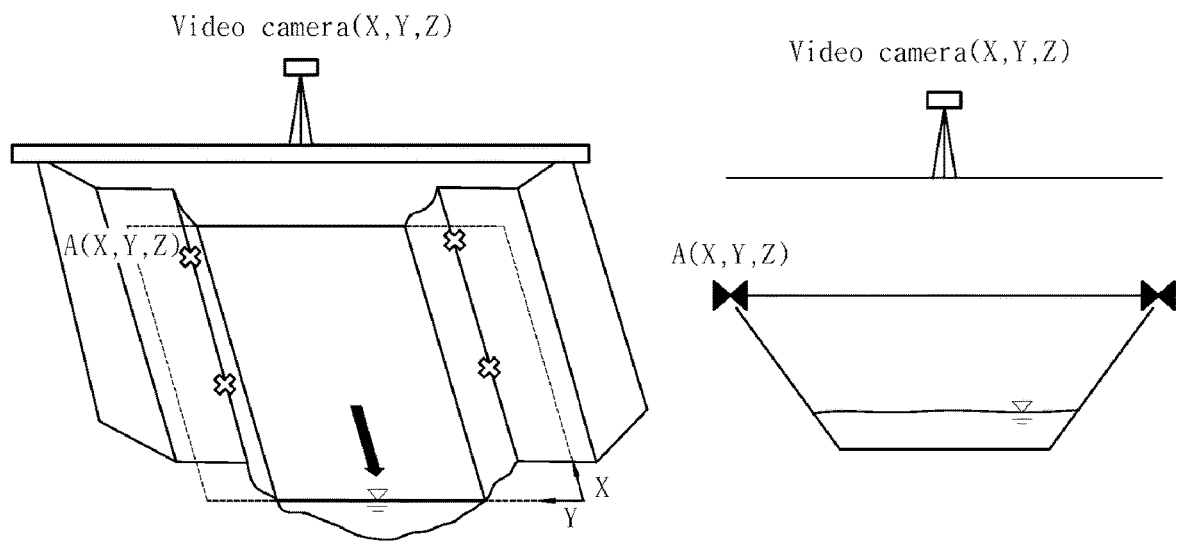
FIGS. 8 to 10 are configuration diagrams illustrating a method of correcting image distortion in consideration of a change in stream water depth.
Figure 9:
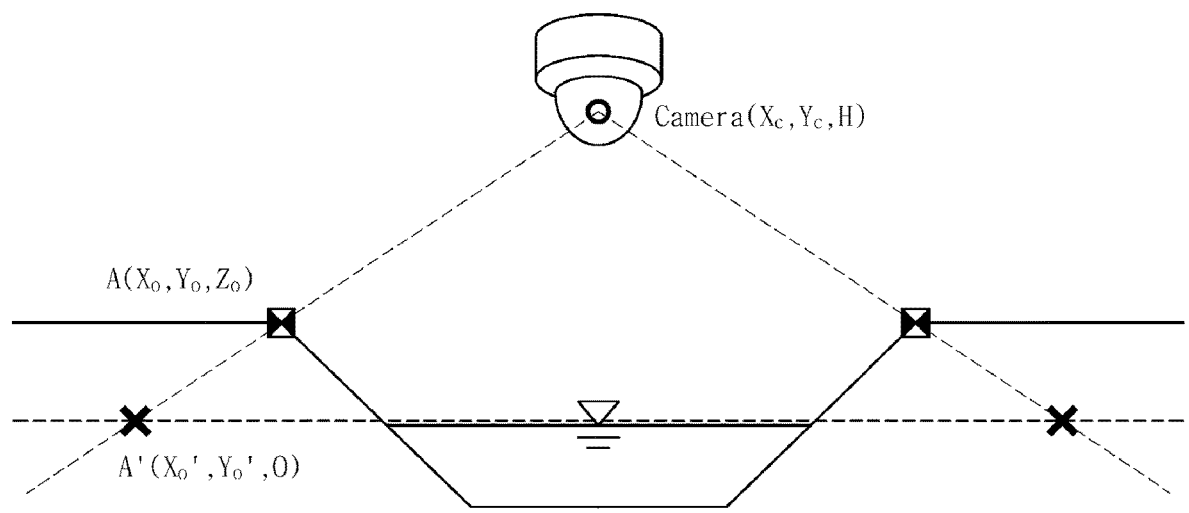
Figure 10:
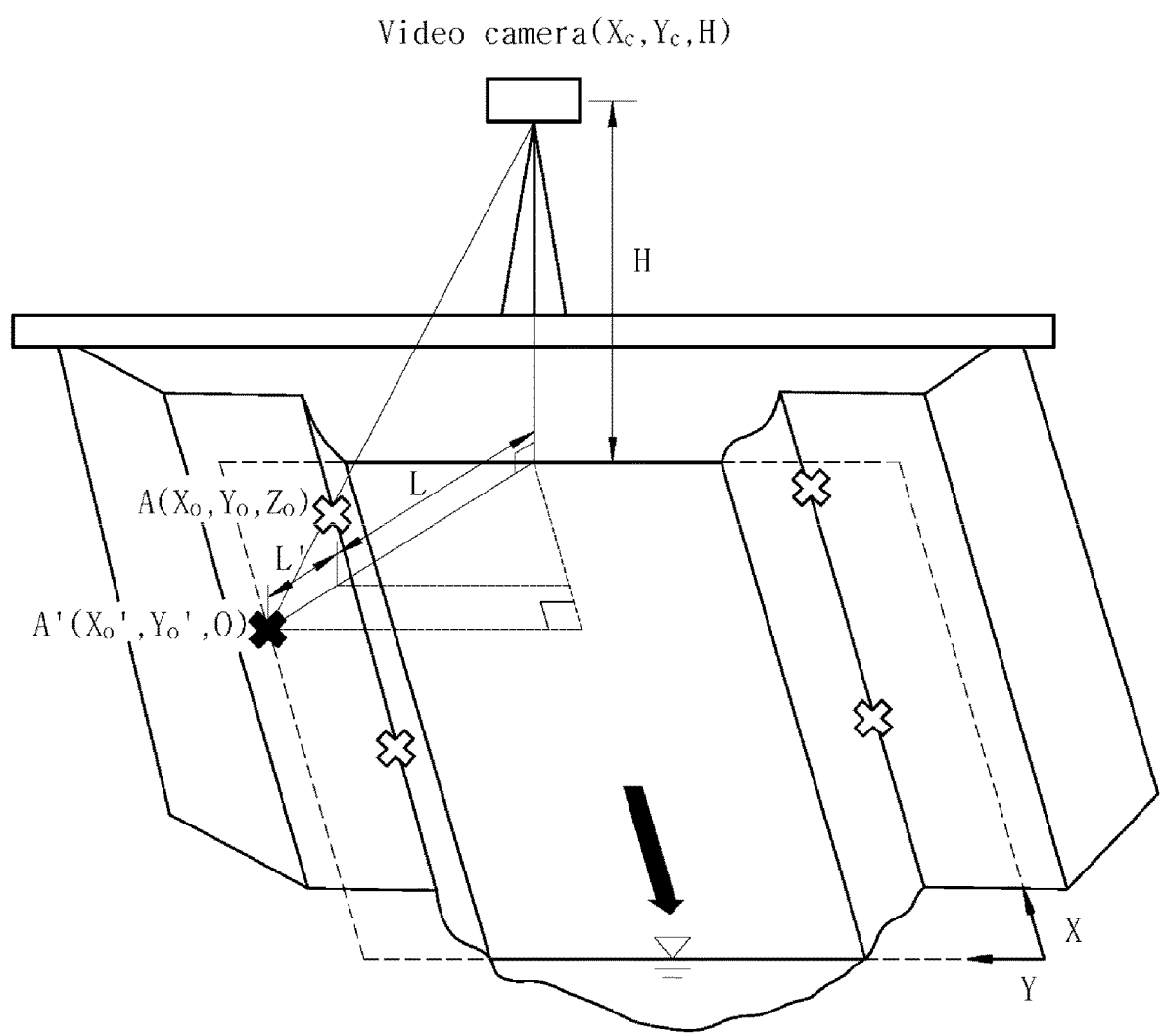

FIGS. 8 to 10 are configuration diagrams illustrating a method of correcting image distortion in consideration of a change in stream water depth.

The method of correcting image distortion is a method of easily and accurately correcting image distortion using four reference points. In the method, in order to consider the water depth change, four reference points are installed at a height of a bank as illustrated in FIG. 8 so that all the reference points at the height of the bank may be photographed.

With such a configuration, even when the water depth is changed as illustrated in FIG. 9, coordinates of an image of the reference point viewed by a camera are not changed.

As illustrated in FIG. 10, actual coordinates $(X'_0, Y'_0, Z'_0)$ of a point A' at the same height as the water surface may be obtained using actual coordinates $(X_c, Y_c, H)$ of the camera, a height (H) from the camera to the water surface, and actual coordinates $(X_0, Y_0, Z_0)$ of a reference point A on the bank.

$$X'_0 = X_c + (L+L')\frac{X_0 - X_c}{L} = X_c + \frac{H}{H-Z_0}(X_0 - X_c), \text{ and} \quad \text{[Equation 12]}$$

$$Y'_0 = Y_c + (L+L')\frac{Y_0 - Y_c}{L} = Y_c + \frac{H}{H-Z_0}(Y_0 - Y_c)$$

Here, equations, $L=\sqrt{(X_c-X_0)^2+(Y_c-Y_0)^2}$, $L' \to H:(L+a) = Z_0:a$, and $$L' = \frac{LZ_0}{(H-Z_0)},$$

are satisfied.

In the device and the method for measuring the stream flow velocity using optical flow image processing according to the present invention described above, a pixel flow velocity is calculated from consecutive images collected by a camera for cross-sectional information, an analysis time, an analysis interval, and an analysis region of a site, and the calculated pixel flow velocity is converted into an actual physical flow velocity, and thus the efficiency and accuracy of the flow velocity measurement may be increased.

The present invention may use a two-dimensional projection coordinate conversion program and a cross-correlation method in order to measure the surface flow velocity and include an image conversion configuration for converting the distorted image into the normal image, an image analysis configuration for measuring the surface flow velocity using a cross-correlation method (calculate the displacement of tracer groups by searching for similarity of contrast value distribution within the size of the correlation region), a filtering configuration for removing data having a low correction coefficient among pieces of the measured flow velocity data, and a configuration for storing the measured flow velocity data which is time-averaged as measurement results.

In the optical flow image processing according to the present invention, a place where a contrast value distribution at a specific position of one frame and a contrast value distribution at a next frame are best matched is found so that a moving distance is calculated.

Since the moving distance is calculated using the contrast value of each pixel in the image, the calculation time is advantageously very short. Therefore, the real-time flow velocity may be calculated very rapidly even in the case of a sharp increase in a discharge in the stream so that the optical flow image processing may be effectively applied to real-time flow velocity measurement of the stream that cannot be performed by LSPIV and STIV.

While the present invention has been particularly described with reference to exemplary embodiments, it will be understood by those skilled in the art that various changes in form and details may be made without departing from the spirit and scope of the present invention.

Therefore, the exemplary embodiments should be considered in a descriptive sense only and not for purposes of limitation. The scope of the invention is defined not by the detailed description of the invention but by the appended claims and encompasses all modifications and equivalents that fall within the scope of the appended claims and will be construed as being included in the present invention.

The present invention relates to a device and a method for measuring a stream flow velocity using optical flow image processing, which calculate a pixel flow velocity from consecutive images collected by a camera for cross-sectional information, analysis time, analysis interval, and analysis region of a site and convert the calculated pixel flow velocity into an actual physical flow velocity to increase the efficiency and accuracy of the flow velocity measurement.

The invention claimed is:

1. A stream flow velocity measurement device using optical flow image processing, the stream flow velocity measurement device comprising:
   an image photographing unit configured to acquire consecutive images of a flow velocity measurement site of a stream;
   an image conversion analysis unit configured to dynamically extract frames of the consecutive images in order to normalize image data of the image photographing unit, image-convert the extracted frames, and perform homography calculation;
   an analysis region extracting unit configured to extract an analysis region of an analysis point;
   a pixel flow velocity calculating unit configured to calculate a pixel flow velocity using an image in the analysis region of the analysis point extracted by the analysis region extracting unit; and
   an actual flow velocity calculating unit configured to convert the pixel flow velocity calculated by the pixel flow velocity calculating unit into an actual flow velocity.

2. The stream flow velocity measurement device of claim 1, wherein, in order to perform homography calculation, the image conversion analysis unit calculates average X and Y coordinates of input points, move corresponding coordinates to an origin, convert a distance between the input points and the average X and Y coordinates, and normalize image data.

3. The stream flow velocity measurement device of claim 1, wherein, in order to calculate a surface flow velocity field to which an optical flow is applied, the pixel flow velocity calculating unit reads a preset grid setting, declares the number (N) of images to be analyzed and an array (a matrix) for storing analysis results, stores the image in the array, and calculates the surface flow velocity field by repeating analysis between images as many times as the number of grid points.

4. The stream flow velocity measurement device of claim 1, wherein, in order to calculate a point flow velocity, the pixel flow velocity calculating unit calculates the pixel flow velocity by declaring an image parameter and a grid point parameter and extracting the image at a grid point position, determines a grid point position parameter, a pixel flow velocity parameter, and a filter coefficient parameter, performs filtering when an error calculated when a point flow velocity error is calculated is greater than a filter coefficient, and calculates the point flow velocity.

5. The stream flow velocity measurement device of claim 1, wherein, in order to correct distortion of the image photographed by the image photographing unit, four reference points are installed at a height of a bank such that coordinates of an image of the reference point viewed by a camera are not changed even when a water depth is changed, and actual coordinates $(X'_0, Y'_0, Z'_0)$ of a point (A') at the same height as a water surface are obtained using actual coordinates $(X_c, Y_c, H)$ of the camera, a height (H) from the camera to the water surface, and actual coordinates $(X_0, Y_0, Z_0)$ of a reference point (A) on the bank.

6. A stream flow velocity measurement method using optical flow image processing, the stream flow velocity measurement method comprising:

an image photographing operation of acquiring consecutive images of a flow velocity measurement site of a stream;

an image conversion analyzing operation of dynamically extracting frames of the consecutive images, image-converting the extracted frames, and performing homography calculation in order to normalize image data acquired in the image photographing operation;

an analysis region extracting operation of extracting an analysis region of an analysis point;

a pixel flow velocity calculating operation of calculating a pixel flow velocity through the image in the analysis region of the analysis point extracted in the analysis region extracting operation; and an actual flow velocity calculating operation of converting the pixel flow velocity calculated in the pixel flow velocity calculating operation into an actual flow velocity.

7. The stream flow velocity measurement method of claim 6, wherein, in the image conversion analyzing operation, in order to perform homography calculation, average X and Y coordinates of input points are calculated, corresponding coordinates are moved to an origin, a distance between the input points and the average X and Y coordinates are converted, and image data is normalized.

8. The stream flow velocity measurement method of claim 6, wherein, in order to calculate a surface flow velocity field to which an optical flow is applied, the pixel flow velocity calculating operation includes:

an operation of defining a grid parameter including M points to be analyzed;

an operation of reading a preset grid setting and declaring the number (N) of images to be analyzed an array for storing analysis results;

an operation of storing the images photographed by a camera in the array; and an operation of storing the analysis results in the array by repeating analysis between images as many times as the number of grid points.

9. The stream flow velocity measurement method of claim 6, wherein, in order to calculate a point flow velocity calculation, the pixel flow velocity calculating operation includes:

an operation of declaring the image and a grid point parameter and extracting the image at a grid point position;

an operation of applying an optical flow pixel flow velocity calculation algorithm, declaring a grid point position parameter, a pixel flow velocity parameter, and a filter coefficient parameter and converting the grid point position and the pixel flow velocity into the actual flow velocity; and an operation of performing filtering when the calculated flow velocity error is greater than the filter coefficient, and otherwise, an operation of outputting a result of the flow velocity calculation.

10. The stream flow velocity measurement method of claim 6, wherein the pixel flow velocity calculating operation includes:

an operation of declaring an image parameter and declaring an X-direction parameter, a Y-direction parameter, and a time differential parameter; and an operation of performing an X-direction image differential, a Y-direction image differential, and a time direction image differential and calculating the pixel flow velocity.

11. The stream flow velocity measurement method of claim 6, wherein a homogeneous form for homography calculation is defined as $$\begin{bmatrix} x' \\ y' \\ 1 \end{bmatrix} = \begin{bmatrix} h_{11} & h_{12} & h_{13} \\ h_{21} & h_{22} & h_{23} \\ h_{31} & h_{32} & 1 \end{bmatrix} \begin{bmatrix} x \\ y \\ 1 \end{bmatrix}$$

$$A' = HA$$

here, x and y denote coordinates before the image conversion, x' and y' denote coordinates after the image conversion, and $h_{11}, h_{12}, h_{13}, h_{21}, h_{22}, h_{23}, h_{31}$, and $h_{32}$ denote parameters required for the image conversion.

12. The stream flow velocity measurement method of claim 11, wherein forms for the homography calculation are defined as $$\begin{bmatrix} x' \\ y' \\ 1 \end{bmatrix} = \begin{bmatrix} h_{11} & h_{12} & h_{13} \\ h_{21} & h_{22} & h_{23} \\ h_{31} & h_{32} & 1 \end{bmatrix} \begin{bmatrix} x \\ y \\ 1 \end{bmatrix} = \begin{bmatrix} h_{11}x + h_{12}y + h_{13} \\ h_{21}x + h_{22}y + h_{23} \\ h_{31}x + h_{32}y + 1 \end{bmatrix} \rightarrow x' = \frac{h_{11}x + h_{12}y + h_{13}}{h_{31}x + h_{32}y + 1}, y' = \frac{h_{21}x + h_{22}y + h_{23}}{h_{31}x + h_{32}y + 1},$$

and $$\begin{bmatrix} x_1 & y_1 & 1 & 0 & 0 & 0 & -x_1 x'_1 & -y_1 x'_1 \\ 0 & 0 & 0 & x_1 & y_1 & 1 & -x_1 y'_1 & -y_1 y'_1 \\ \cdots & \cdots & \cdots & \cdots & \cdots & \cdots & \cdots & \cdots \\ 0 & 0 & 0 & x_4 & y_4 & 1 & -x_4 y'_4 & -y_4 y'_4 \end{bmatrix} \begin{bmatrix} h_{11} \\ h_{12} \\ h_{13} \\ h_{21} \\ h_{22} \\ h_{23} \\ h_{31} \\ h_{32} \end{bmatrix} =$$

-continued $$\begin{bmatrix} x'_1 \\ x'_4 \\ \ldots \\ y'_4 \end{bmatrix} \Rightarrow AX = B \Rightarrow X = A^{-1}B.$$

13. The stream flow velocity measurement method of claim 6, wherein, in order to correct distortion of the image photographed by the image photographing operation, four reference points are installed at a height of a bank such that coordinates of an image of the reference point viewed by a camera are not changed even when a water depth is changed, and actual coordinates $(X'_0, Y'_0, Z'_0)$ of a point (A') at the same height as a water surface are obtained using actual coordinates $(X_c, Y_c, H)$ of the camera, a height (H) from the camera to the water surface, and actual coordinates $(X_0, Y_0, Z_0)$ of a reference point (A) on the bank.

14. The stream flow velocity measurement method of claim 13, wherein the actual coordinates $(X'_0, Y'_0, Z'_0)$ of the point (A') at the same height as the water surface are obtained using equations, $$X'_0 = X_c + (L+L')\frac{X_0 - X_c}{L} = X_c + \frac{H}{H - Z_0}(X_0 - X_c), \text{ and}$$

$$Y'_0 = Y_c + (L+L')\frac{Y_0 - Y_c}{L} = Y_c + \frac{H}{H - Z_0}(Y_0 - Y_c),$$

wherein, equations, $L=\sqrt{(X_c-X_0)^2+(Y_c-Y_0)^2}$, $L'\rightarrow H:(L+a)=Z_0:a$, and $$L' = \frac{LZ_0}{(H - Z_0)},$$

are satisfied.

15. The stream flow velocity measurement method of claim 6, wherein, in the actual flow velocity calculating operation, the actual flow velocity is defined as $$V_\gamma = V_p \times LPP \times K,$$

here, $V_\gamma$ denotes the actual flow velocity, $V_p$ denotes the pixel flow velocity, LPP denotes a distance per pixel, and K denotes a scale factor.

16. The stream flow velocity measurement method of claim 15, wherein the distance per pixel is defined as $$LPP = \frac{\sum_{i=0}^{N-1} L_r}{\sum_{i=0}^{N-1} L_p},$$

here, LPP denotes the distance per pixel, N denotes the number of reference points of the image conversion, $L_\gamma$ denotes a physical distance between two neighboring reference points of the image conversion, and $L_p$ denotes a pixel distance between two neighboring reference points of the image conversion.

17. The stream flow velocity measurement method of claim 15, wherein the scale factor is defined as $$K = \frac{D_2}{D_1},$$

here, K denotes the scale factor, $D_1$ denotes an initial average altitude difference between a sensor and the reference point of the image conversion, and $D_2$ denotes an average altitude difference between the sensor and the reference point of the image conversion.

18. The stream flow velocity measurement method of claim 6, wherein in the pixel flow velocity calculating operation, an equation for pixel flow velocity calculation is defined as $$I(x,y,t) = I(x+\delta x, y+\delta y, t+\delta t),$$

here, I denotes a pixel value of the image, x denotes an X-direction coordinate, y denotes a Y-direction coordinate, t denotes time, and $\delta_t$ denotes an amount of time change.

19. The stream flow velocity measurement method of claim 18, wherein an equation for pixel flow velocity calculation is defined as $$I(x+\delta x, y+\delta y, t+\delta t) = I(x, y, t) + \frac{\partial I}{\partial x}\delta x + \frac{\partial I}{\partial y}\delta y + \frac{\partial I}{\partial t}\delta t +,$$

and using the fact that a sum of the derivatives of a right expression should be zero, an equation for the pixel flow velocity calculation is defined as $$\frac{\partial I}{\partial x}\delta x + \frac{\partial I}{\partial y}\delta y + \frac{\partial I}{\partial t}\delta t = 0 \rightarrow I_x V_x + I_y V_y = -I_t,$$

here, $I_x$ denotes an X-direction differential matrix of the image, $I_y$ denotes a Y-direction differential matrix of the image, $V_x$ denotes an X-direction pixel velocity, $V_y$ denotes a Y-direction pixel velocity, and $I_t$ denotes a time differential matrix of the image.

20. The stream flow velocity measurement method of claim 19, wherein an equation for pixel flow velocity calculation is defined as $$Av = b, \text{ and}$$

$$A = \begin{bmatrix} I_x(q_1) & I_y(q_1) \\ I_x(q_2) & I_y(q_2) \\ \vdots & \vdots \\ I_x(q_n) & I_y(q_n) \end{bmatrix} \quad v = \begin{bmatrix} V_x \\ V_y \end{bmatrix} \quad b = \begin{bmatrix} -I_t(q_1) \\ -I_t(q_2) \\ \vdots \\ -I_t(q_n) \end{bmatrix}$$

here, $q_n$ denotes an $n^{th}$ pixel, and n denotes the number of pixels in the image.

* * * * *